(12) United States Patent
Ungureanu

(10) Patent No.: US 8,375,164 B2
(45) Date of Patent: Feb. 12, 2013

(54) CONTENT ADDRESSABLE STORAGE WITH REDUCED LATENCY

(75) Inventor: Cristian Ungureanu, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 160 days.

(21) Appl. No.: 12/905,223

(22) Filed: Oct. 15, 2010

(65) Prior Publication Data

US 2012/0096219 A1    Apr. 19, 2012

(51) Int. Cl.
*G06F 12/00*    (2006.01)
(52) U.S. Cl. .................... 711/108; 711/118; 711/206
(58) Field of Classification Search .............. 711/108, 711/118, 206
See application file for complete search history.

(56) References Cited

U.S. PATENT DOCUMENTS

| 7,240,150 | B1* | 7/2007 | Todd et al. ................ 711/108 |
| 7,260,681 | B2* | 8/2007 | Lubbers ..................... 711/113 |
| 2004/0186849 | A1* | 9/2004 | Enko et al. ................. 707/102 |
| 2005/0015758 | A1 | 1/2005 | North |
| 2006/0004957 | A1* | 1/2006 | Hand et al. ................. 711/113 |
| 2009/0228511 | A1 | 9/2009 | Atkin et al. |
| 2009/0254709 | A1 | 10/2009 | Agesen |
| 2009/0307430 | A1 | 12/2009 | Bruening |
| 2010/0070698 | A1 | 3/2010 | Ungureanu et al. |

* cited by examiner

*Primary Examiner* — Kalpit Parikh
(74) *Attorney, Agent, or Firm* — Joseph Kolodka; James Bitetto

(57) ABSTRACT

A system and method for storing data in a content-addressable system is provided. The system includes a content-addressable storage system and a persistent cache. The persistent cache includes a temporary address generator that is configured to generate a temporary address which is associated with data to be stored in the persistent cache, and a non-content-addressable storage system configured to store and retrieve data in the persistent cache using the temporary address. The persistent cache further comprises an address translator configured to map a temporary address associated with the data in the non-content addressable storage system with a content address associated with the data in the content-addressable storage system.

14 Claims, 3 Drawing Sheets

CONTENT ADDRESSABLE STORAGE WITH REDUCED LATENCY

BACKGROUND

1. Technical Field

The present invention relates to storing data in a content-addressable storage system, and more specifically, to interposing a storage layer between an application and a content-addressable storage system for reducing the latency associated with writing data to the content-addressable storage system.

2. Description of the Related Art

Content-addressable storage (CAS) systems are more complex with respect to writing data than traditional storage systems. Before acknowledging a synchronous write operation, a CAS system calculates a hashkey based on the content of the block, performs a check to determine whether or not a block with identical contents (to the one currently being written) has already been written to the CAS system (e.g., by looking up values in a hash table), and writes the block if it determines that the block is unique. The acknowledgment also returns a content address, which is equal to or derived from the hashkey. The content address is used during read operations to retrieve the block.

The calculation of the hashkey, as well as the check to determine whether or not a block with identical contents was previously stored, contribute significantly to the latency associated with writing data to a CAS system.

SUMMARY

In accordance with the present principles, a system is provided for storing data in a storage system. The system includes a content-addressable storage system and a persistent cache. The persistent cache includes a temporary address generator that configured to generate a temporary address which is associated with data to be stored in the persistent cache, and a non-content-addressable storage system configured to store and retrieve data in the persistent cache using the temporary address. The persistent cache further comprises an address translator configured to map a temporary address associated with the data in the non-content addressable storage system with a content address associated with the data in the content-addressable storage system.

In accordance with the present principles, a method for storing data in a storage system includes determining whether data associated with a write request is to be stored in a non-content-addressable storage system or written directly to a content-addressable storage system. If it is determined that the data is to be stored in the non-content-addressable storage system, a temporary address is generated for the data to be stored in the non-content-addressable store and an acknowledgement that data is persistently stored in the non-content addressable storage system may be sent before the data is written to a content-addressable storage system. In addition, at least one temporary address associated with the data in the non-content-addressable store is mapped with a content address of the data in the content-addressable storage system after the data is written to the content-addressable storage system.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
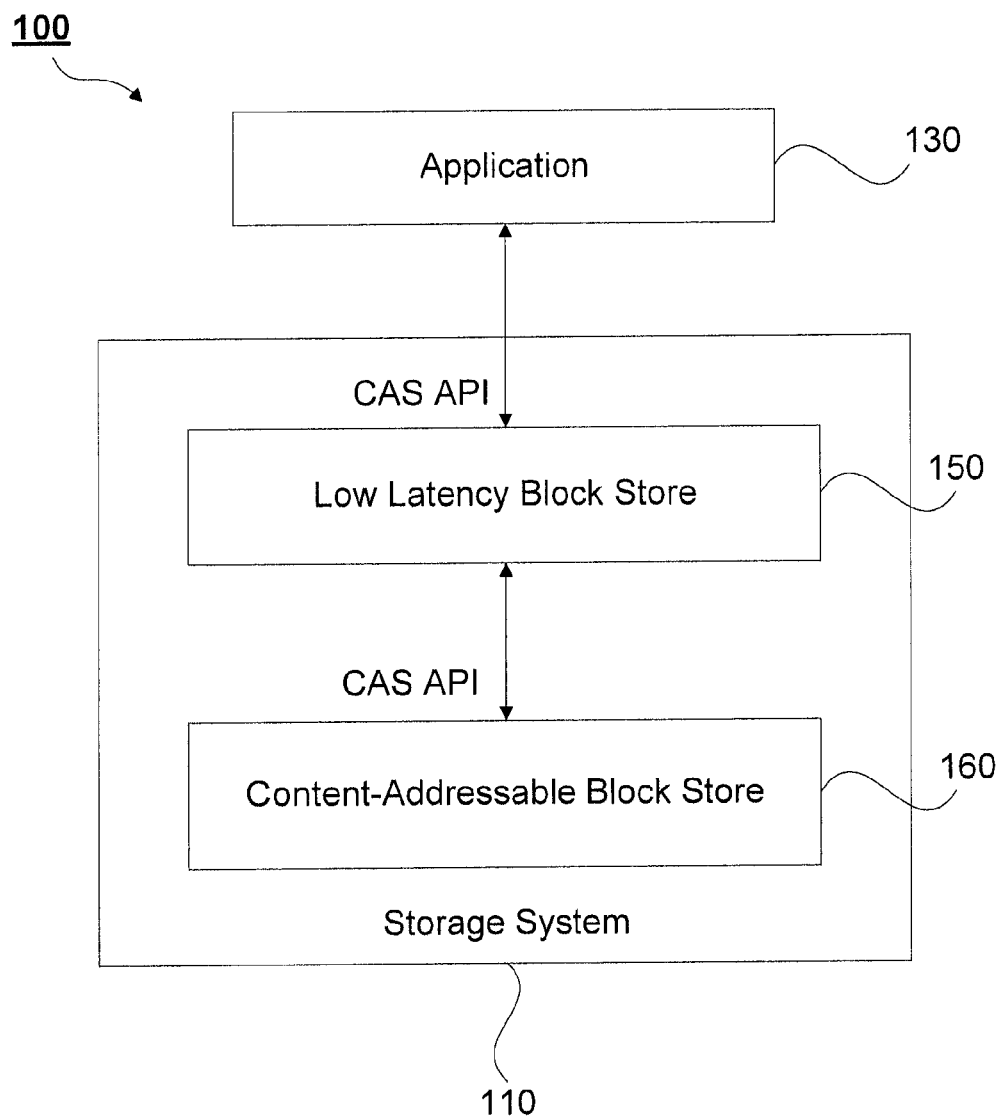
FIG. 1 is block/flow diagram of a system for storing data in a content-addressable storage system in accordance with the present principles.

In accordance with the present principles, a description of a storage system is provided which can reduce the latency associated with accesses to a content-addressable storage system. The system interposes a storage layer comprised of a low latency block store (LLBS) between a content-addressable block store (CABS) and an application which is issuing I/O operations in accordance with a content-addressable API. Rather than writing blocks directly to the CABS, blocks can first be written to the LLBS, acknowledged, and subsequently transferred to the CABS. At some point later in time, the blocks may then be removed from LLBS. In doing such, the disadvantages (e.g., high latency) associated with writing to content-addressable storage are eliminated or mitigated, while the advantages of using content-addressable storage (e.g., de-duplication) are retained.

An LLBS may utilize a solid-state drive or hard disk drive for persistent storage. These devices are optimized to reduce latency associated with I/O operations. In accordance with the principles described herein, the LLBS can store data temporarily and return an acknowledgement to an application so that the application does not experience the delay associated with calculating a hash or searching for values in hash table. The LLBS can also initiate a write to CABS which includes the same data that was written to the LLBS. Writes to the CABS experience high latency because of the delays associated with calculating hashes and looking up values in a hash table. However, the latency is not experienced by the application (or an end user utilizing the application) because the LLBS is able to quickly store the data and return an acknowledgment.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or system) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices and systems (including but not limited to keyboards, displays, pointing systems, etc.) may be coupled to the system either directly or through intervening I/O controllers.

Network adapters may also be coupled to the system to enable the data processing system to become coupled to other data processing systems, remote printers, storage devices, or storage systems through intervening private or public networks. Modems, cable modem and Ethernet cards are just a few of the currently available types of network adapters.

Referring now to the drawings in which like numerals represent the same or similar elements and initially to FIG. 1, a block/flow diagram illustratively depicts a system 100 for storing data in a content-addressable storage system in accordance with the present principles. As shown therein, an application 130 stores data in a storage system 110. The application 130 may be executing locally on a computer which comprises storage system 110, or may be executing on a client machine that is coupled to a server or other system (e.g., via a network) which comprises storage system 110.

Storage system 110 comprises a low latency block store (LLBS) 150 and a content-addressable block store (CABS) 160. The CABS 160 may represent any type of content-addressable storage system. On the other hand, the LLBS 150 may include a solid-state drive (SSD) or hard disk drive (HDD) which is optimized to reduce latency associated with I/O operations. However, LLBS 160 is not limited to these types of storage devices, and, in general, may utilize any non-content-addressable storage media that has lower latency than CABS 160 with respecting to input/output (I/O) operations.

Rather than directly storing data to the CABS 160, the application 130 may initially store data in the LLBS 150. Upon successfully storing data to the LLBS 150, an acknowledgment is returned to the application 130. Since the LLBS 150 provides for reduced latency, the acknowledgement is returned relatively quickly, or at the least, quicker than CABS 160 is able to return an acknowledgment.

As can be seen, a content-addressable storage application programming interface (API) permits communication between both the application 130 and the LLBS 150 and LLBS 150 and the CABS 160.

Figure 2:
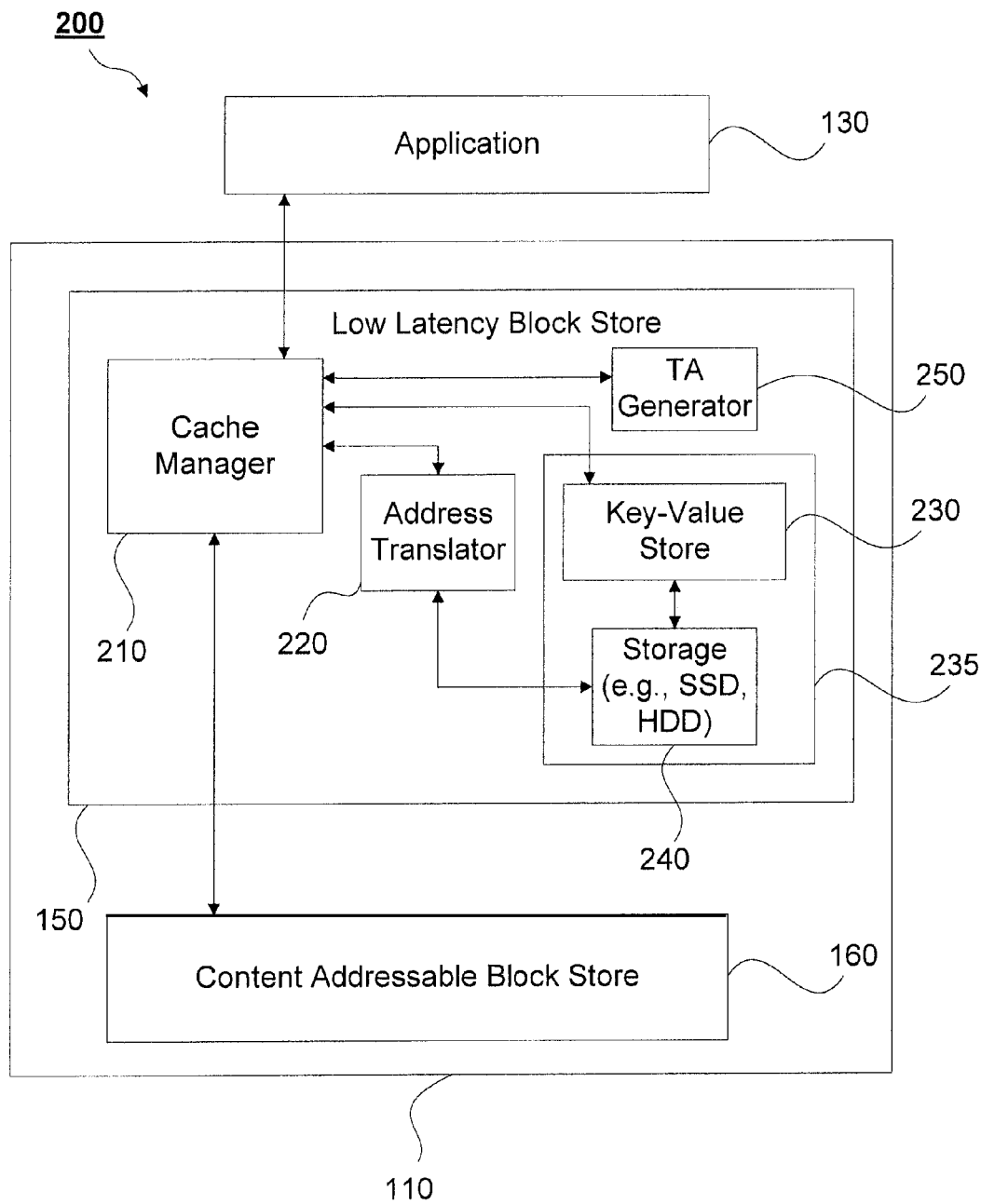
FIG. 2 is block/flow diagram illustrating in further detail the system in FIG. 1 for storing data in a content-addressable storage system.

Moving on to FIG. 2, a more detailed view of a system 200 for storing data in a content-addressable storage system is illustratively depicted. Application 130 sends a write request to LLBS 150. Upon receiving a write request from the application 130, the cache manager 210 may forward the request to the non-content addressable storage system 235 which is configured as a key-value store 230 which uses the storage device 240 to store data persistently. To store the data from the write request to the non-content addressable storage system 235, the cache manager 210 obtains a temporary address from the temporary address ("TA") generator 250 and this address will be used as the key with which the data may be later retrieved.

The key-value store 230 is responsible for controlling the manner in which data is stored in the storage device 240. The key-value store 230 stores both the data and its temporary address in storage device 240. The data can later be retrieved or read using the temporary address. Storage device 240 is preferably a low latency system such as a solid-state drive (SSD), hard disk drive (HDD), or other device that provides for a lower latency than CABS 160 with respect to performing I/O operations.

Upon writing the data to the LLBS 150, the cache manager 210 will forward an acknowledgment to the application 130 along with the temporary address that can be used to retrieve the data. The cache manager 210 will write the data, which has already been written to storage device 240, to the CABS 160 as well. In storing the data, the CABS 160 will compute a hashing value based on the content of the data and perform de-duplication operations (e.g., which may involve looking up values in a hash table). Even if two identical blocks had been written to the LLBS 150 and each was assigned a separate temporary address, both of these blocks will eventually be mapped to the same content address when the LLBS 150 transfers the data to the CABS 160. Since the LLBS 150 had previously confirmed a successful write operation, the application 130 can avoid the latency associated with these hashing and hash table lookup operations while retaining the de-duplication benefits associated with storing data in the CABS 160.

After successfully storing the data, the CABS 160 returns a content address to cache manager 210 at the LLBS 150 which reflects where the data is stored in the CABS 160. The content address is forwarded to the address translator 220 which will map the temporary address (reflecting the location of the data in the LLBS 150) to the content address (reflecting the location of the data in the CABS 160) and store this mapping information in storage device 240. In the case where blocks have embedded addresses, the data associated with each embedded address should first be written to the CABS 160 and mapped to a corresponding content address before the parent block is written to the CABS 160. This avoids writing temporary addresses to the CABS 160.

Once the mapping of addresses has been persistently written to storage device 240, the LLBS 150 can delete the corresponding data in storage device 240. If the application 130 issues a subsequent read request using the temporary address, the content address associated with the temporary address can first be retrieved by the address translator 220, and this information can be used to retrieve the data from the CABS 160.

Although data blocks can be removed from the LLBS 150 in the manner explained above, removing the mapping of a temporary address to a content address may involve the cooperation of the application 130. Cooperation of the application 130 is needed to avoid a situation where the application 130 requests a block using its temporary address, but neither the block, nor the mapping from that temporary address to the content address, is available at the LLBS 150. One way to avoid this situation is to have the application 130 periodically drop all of its addresses. Once this is done, the LLBS 150 can delete all of its mappings. After the application 130 has dropped all of its addresses and the LLBS 150 has deleted all of its mappings, the application 130 can access blocks by issuing a read for the labeled block representing the root of a directed acyclic graph, e.g., in the manner explained in United States Patent Application 2010/0070698 which is herein incorporated by reference in its entirety.

While data is typically stored at the LLBS 150 before being transferred to the CABS 160, there may be certain situations where it is preferable for the data to be stored directly in the CABS 160. For example, consider the case where application 130 issues a write request to the LLBS 150, but the LLBS 150 does not have sufficient space available for storing the data. Rather than waiting for the LLBS 150 to free up space by transferring data to the CABS 160, it may advantageous to write the incoming data block directly to the CABS 160. It should be noted that this is just one exemplary situation where it may be preferable to store data directly in the CABS 160, and that there may be a variety of other situations where data could be written directly to the CABS 160.

Since data may sometimes be stored directly to the CABS 160, there may be situations where the LLBS 150 returns a content address, rather than a temporary address, to the application 130. This can be handled transparently by the application 130. However, the LLBS 150 needs to be able to distinguish between temporary addresses and content addresses. This can be achieved by reserving a bit in the address which indicates whether the address is a content address or a temporary address.

Figure 3:
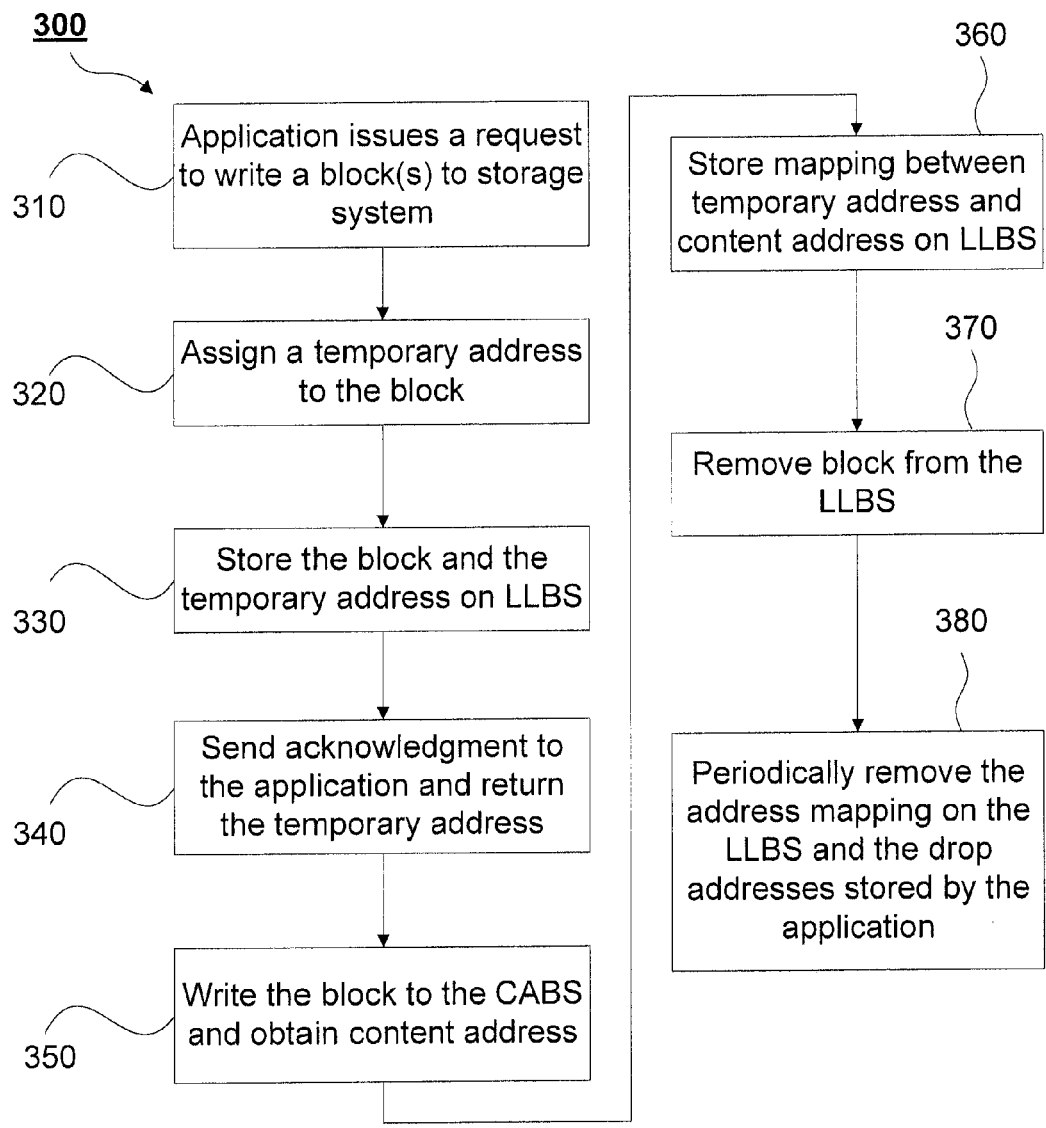
FIG. 3 is block/flow diagram illustrating a method for storing data in a content-addressable storage system in accordance with the present principles.

Referring now to FIG. 3, a block/flow diagram illustrates a method for storing data in a content-addressable storage system in accordance with the present principles. In block 310, an application 130 issues a write request to store data on a storage system 110. The storage system 110 may include both a non-content-addressable system (e.g., LLBS 150) and a CABS 160 as shown in FIGS. 1 and 2.

Upon receiving the write request, the LLBS 150 will assign a temporary address to the data in block 320. The temporary address is used to store and retrieve the data in the non-content addressable storage 235. Unlike the content address which will be subsequently assigned by the CABS 160, determining a temporary address for storing the data does not involve computing a hash. In one embodiment, the temporary address may be generated by the temporary address generator 250 in FIG. 2, and used by the key-value store 230 to store the data.

Next, in block 330, the data which is the subject of the write request is stored at the LLBS 150 along with the temporary address which was assigned to the data block. The manner in which this information is stored may differ. For example, in one embodiment, the non-content addressable store is configured as a key-value store, where the keys are the temporary addresses and the values are the data contents of the write requests. Moreover, although FIG. 2 discloses a single storage device 240 for storing both the mapping from temporary address to content addresses and the data retrievable through the temporary address, in other embodiments the mapping between temporary address and content addresses, and the data retrievable through the temporary address may be stored on separate storage devices.

After the data from the application 130 has been stored in the LLBS 150, the LLBS 150 sends an acknowledgement to that application 130 which indicates that the data has been successfully stored (block 340). The acknowledgement sent from the LLBS 150 to the application 130 also includes the temporary address associated with the data to allow the application 130 to later retrieve the data. As explained above, the storage device 240 at the LLBS 150 provides for relatively low latency with respect to storing information when compared to the CABS 160. Since the LLBS 150 is able to write the data to storage device 240 and return an acknowledgment to the application 130 more quickly than CABS 160 would have been able to do so, the latency experienced by the application 130 is reduced.

Upon forwarding the acknowledgment to the application 130, the LLBS 150 will subsequently write the data to the CABS 160 in block 350. Once the data stored at the LLBS 150 has been successfully copied to the CABS 160, the CABS 160 will return a content address to the LLBS 150. The content address, which is based on the content of the data block being written to CABS 160, reflects where the data is written in the CABS 160.

As explained above, storing data in a content-addressable system (e.g., CABS 160) involves performing latency-intensive operations such as computing a hash and performing de-duplication operations. However, by storing data initially at LLBS 150 before transferring the data to CABS 160, the application 130 does not have wait for these latency-intensive operations to be performed. Nevertheless, since the data is eventually transferred to the CABS 160, the application 130 is able to appreciate the benefits of the de-duplication performed by the CABS 160. Hence, the storage system 110 of the present application allows an application 130 to reap the benefits of content-addressable storage while eliminating, or at least mitigating, the disadvantages of storing data in such a system.

After the data is stored in CABS 160 and the content address is returned to the LLBS 150, the content address will be sent to the address translator 220 which is configured to map the temporary address to the content address and store this information in storage device 240 (block 360). Upon storing the mapping information, the data (which is currently stored in both the LLBS 150 and the CABS 160) may be deleted from the LLBS 150 in block 370. If the application 130 wishes to read the data at some later point, the read request may include the temporary address of the data. Despite the fact that the data which was previously stored at LLBS 150 has been deleted from LLBS 150, the temporary address may be used by the address translator 220 to identify the corresponding content address of the data in the CABS 160. The data may then be read from the CABS 160 using the content address.

In block 380, the address mapping (i.e., the mappings between the temporary address and the content address) on the LLBS 150 are periodically removed. This may be advantageous because the mappings stored at LLBS 150 may grow to be very large in size, thus taking up space in the storage device 240 which can be used otherwise for storing data. However, before the mapping information can be deleted from the LLBS 150, the application 130 should drop the addresses (or at least the temporary addresses) that are being stored by the application 130. This ensures that the application 130 does not issue a request for data (using the temporary address of the data) at the LLBS 150 when neither the data itself, nor the mapping of the data, is stored in the LLBS 150.

The manner in which the application 130 is told to drop address may differ. For example, in one embodiment, the LLBS 150 may monitor the amount of mapping information being stored. Once the size of the mapping information exceeds a certain threshold, the LLBS 150 may send an "address drop signal" to the application 130 to tell the application 130 that the address information being stored by the application 130 should be dropped. After the application 130 has dropped the addresses, an acknowledgment may be sent to the LLBS 150 which indicates such. Upon confirming that the addresses were dropped by the application 130, the LLBS 150 can then delete the mapping information stored on storage device 240. Other ways of indicating that addresses should be dropped by the application 130 are also contemplated.

Having described the preferred embodiments of a system and method for storing data in a content-addressable storage system (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A storage system, comprising:
a content-addressable storage system and a persistent cache, wherein the persistent cache comprises:
a non-volatile memory;
a temporary address generator configured to generate a temporary address which is associated with data to be stored in the persistent cache in response to a write request from an application;
a non-content-addressable storage system configured to store and retrieve data in the persistent cache using the temporary address;
a cache manager configured to forward a write acknowledgment comprising the temporary address to the application and write the data that was stored in the non-content-addressable storage system to the content-addressable storage system; and
an address translator configured to map a temporary address associated with the data in the non-content addressable storage system with a content address associated with the data in the content-addressable storage system;
wherein the application initially request the data using the temporary address and subsequently requests the data using the content address, and wherein the cache manager issues a read request to either the non-content-addressable storage system or the content-addressable storage system depending upon whether an address received from the application is determined to be the temporary address or the content address based on a bit in the address.

2. The system of claim 1, wherein the cache manager is further configured to determine whether an address associated with a read request is the temporary address or the content address.

3. The system of claim 1, wherein the persistent cache handles a read request for the temporary address by reading data associated with the temporary address from the persistent cache if the data resides in the non-content-addressable storage system, or alternatively by obtaining from the address translator the content address associated with the temporary address and issuing a read request to the content-addressable storage system using the content address.

4. The system of claim 1, wherein data is deleted from the persistent cache after the data has been written to the content-addressable storage system, but the mapping between the temporary address and the content address is retained.

5. The system of claim 1, wherein a mapping between the temporary address and the content address is periodically deleted.

6. The system of claim 5, wherein the mapping is deleted after an application drops all temporary addresses returned to it.

7. The system of claim 1, wherein the non-content addressable storage system comprises a solid-state drive or hard disk drive.

8. A method for storing data in a storage system, comprising:
determining whether data associated with a write request issued by an application is to be stored in a non-content-addressable storage system or written directly to a content-addressable storage system;
if it is determined that the data is to be stored in the non-content-addressable storage system:
generating a temporary address for the data to be stored in the non-content-addressable storage system;
issuing an acknowledgment to the application that data is persistently stored in the non-content addressable storage system before the data is written to a content-addressable storage system, the acknowledgment including the temporary address;
writing the data that was stored in the non-content-addressable storage system to the content-addressable storage system; and
mapping at least one temporary address associated with the data in the non-content-addressable storage system with a content address of the data in the content-addressable storage system after the data is written to the content-addressable storage system;
wherein the application initially requests the data using the temporary address and subsequently requests the data using the content address, and wherein a cache manager issues a read request to either the non-content-addressable storage system or the content-addressable storage system depending upon whether an address received from the application is determined to be the temporary address or the content address based on a bit in the address.

9. The method of claim 8, wherein the storage system is configured to determine whether an address associated with a read request is the temporary address or the content address.

10. The method of claim 8, wherein a read request for the temporary address is handled by reading data associated with the temporary address from the non-content addressable storage system if the data resides in the non-content-addressable storage system, or alternatively by obtaining the content address associated with the temporary address and issuing a read request to the content-addressable storage system using the content address.

11. The method of claim 8, wherein data is deleted from the non-content-addressable storage system after the data has been written to the content-addressable storage system, but the mapping between the temporary address and the content address is retained.

12. The method of claim 8, wherein a mapping between the temporary address and the content address is periodically deleted.

13. The method of claim 12, wherein the mapping is deleted after an application drops all temporary addresses returned to it.

14. The method of claim 8, wherein the non-content addressable storage system comprises a solid-state drive or hard disk drive.

* * * * *